(12) United States Patent
Kühn et al.

(10) Patent No.: US 7,251,936 B2
(45) Date of Patent: Aug. 7, 2007

(54) SUSPENSION DEVICE

(75) Inventors: Michael Kühn, Wotenitz (DE); Hubertus Schmidt, Sulzbach (DE)

(73) Assignee: Hydac System GmbH, Sulzbach/Saar (DE)

( * ) Notice: Subject to any disclaimer, the term of this patent is extended or adjusted under 35 U.S.C. 154(b) by 0 days.

(21) Appl. No.: 10/540,010

(22) PCT Filed: Jan. 29, 2004

(86) PCT No.: PCT/EP2004/000762

§ 371 (c)(1),
(2), (4) Date: Jun. 22, 2005

(87) PCT Pub. No.: WO2004/070210

PCT Pub. Date: Aug. 19, 2004

(65) Prior Publication Data

US 2006/0102241 A1 May 18, 2006

(30) Foreign Application Priority Data

Feb. 7, 2003 (DE) .............................. 103 05 790

(51) Int. Cl.
*F16D 32/01* (2006.01)
(52) U.S. Cl. ....................................................... 60/469
(58) Field of Classification Search .................. 60/413, 60/469
See application file for complete search history.

(56) References Cited

U.S. PATENT DOCUMENTS 5,733,095 A 3/1998 Palmer et al.
6,167,701 B1 1/2001 Hatcher et al.
6,279,316 B1 8/2001 Vigholm
6,357,230 B1 * 3/2002 A'Hearn et al. .............. 60/413

FOREIGN PATENT DOCUMENTS

| DE | 196 52 684 A1 | 6/1998 |
|---|---|---|
| DE | 100 60 430 A1 | 6/2001 |
| EP | 0 482 248 A1 | 4/1992 |
| EP | 1 157 963 A2 | 11/2001 |
| JP | 63265023 | 11/1988 |

* cited by examiner

*Primary Examiner*—F. Daniel Lopez
(74) *Attorney, Agent, or Firm*—Roylance, Abrams, Berdo & Goodman, L.L.P.

(57) ABSTRACT

A suspension device is for at least one drive part (10) that is to be cushioned. The drive part can be connected to an accumulator device (12) by a first valve unit (28) and to a tank connection (46) by a second valve unit (34) to transport fluid. The device is provided with a pressure compensation device (50), which when actuated compares the respective prevailing pressures in the drive part (10) and the accumulator device (12) to generate a common pressure level. This comparison permits the pressure level to be rapidly compensated in advance when the actual suspension is enabled in the form of the accumulator device, in such a way that the suspension pressure employed exactly matches the pressure of the respective drive part in the form of a hydraulic or working cylinder that prevails in the later as a result of the preceding load actuation operations.

14 Claims, 1 Drawing Sheet

SUSPENSION DEVICE

FIELD OF THE INVENTION

The present invention relates to a suspension device for at least one drive part which is to be cushioned and which can be connected by a first valve unit to an accumulator device used for suspension to carry fluid. The drive part can be connected by a second valve unit to a tank connection to carry fluid.

BACKGROUND OF THE INVENTION

A suspension device is disclosed in EP-A-1 157 963. This known solution relates to a wheel loader with a swiveling extension arm, which arm can also be changed in its length. To move the extension arm, a hydraulic drive system with individual lifting or working cylinders, preferably one independently working cylinder as the drive part, is assigned to each movable extension arm part. With the working cylinders of the hydraulic system, the swiveling motion can be actuated for the extension arm, and retracting and extending in length changes can be accomplished. By another working cylinder unit, a tool located, for example, on the free end side of the extension arm, for example, in the form of a load fork, can be actuated. Swiveling motion for the extension arm can be accomplished by a parallelogram drive to change the working height of the extension arm relative to the vehicle chassis according to the given working conditions for the wheel loader.

In addition to these drive means in the form of working cylinders, the hydraulic system in the conventional wheel loader design has a suspension device. The suspension device has at least one hydraulic accumulator as an accumulator device and at least two actuatable valve units to connect the accumulator device to the respective hydraulic cylinder or to the ambient pressure or tank pressure in the form of a tank connection for the suspension device. With this suspension device the drive part can be stopped to damp its natural motion dictated, for example, by a load, and can undertake damping when the drive part is being actuated, that is to say, in the known solution when the piston of the hydraulic cylinder consequently is extended or retracted. Thus, for example, in the raised position of the extension arm under the load which is to be moved by a machine in the form of a wheel loader, the accompanying vibration movements on the extension arm can be damped by the known suspension device. The known solution provides for maintenance of the pertinent damping when the working cylinder, and therefore, the drive part are further actuated, for example, to raise or lower the extension arm in this way.

Although the pertinent known solution leads to good damping and suspension behavior overall and on the whole enables a reliable operation of the hydraulic system for a wheel loader, problems can arise when the working cylinder, which is to be cushioned as the drive part, is in a definable load situation accompanied by the corresponding pressure level, especially on the piston side of the respective working cylinder, and as outlined when the suspension is connected by the respective hydraulic accumulator as the accumulator device when it does not have the same pressure level as the drive part used in the form of the respective working cylinder. Depending on the different pressure level, distinct transient and decay effects can occur when the suspension is connected to the respective working cylinder. Such effects can be considerable depending on the difference in level, and lead to deflection movements on the drive part which are critical in terms of safety engineering and accordingly on the mechanical component which is to be moved, for example, in the form of the indicated extension arm. Furthermore, due to the vibration processes, rocking can unintentionally occur on the extension arm until the different pressure levels of the respective working cylinder and hydraulic accumulator have been equalized to one another. In addition to that safety risk, pressure spikes within the piping of the valve units can occur when the different pressure levels are matched, something that can damage the entire system of the tool.

SUMMARY OF THE INVENTION

Objects of the present invention are to provide an improved suspension system, retaining the advantages and avoiding disadvantages described above. Especially, safety risks and overloads in the hydraulic system are reliably avoided.

These objects are achieved by a suspension device with a pressure compensation device, which, when actuated, equalizes the respective fluid pressure prevailing between the drive part and the accumulator device for producing a common pressure level. When the actual suspension is connected in the form of the accumulator device, level compensation is induced for the pressure beforehand in an extremely short time so that the suspension pressure used "is applied" exactly to the pressure of the respective drive part in the form of a hydraulic or working cylinder. This pressure is applied to the working cylinder at that time due to the preceding load actuation processes. An unintentional extension and retraction movement of the piston rod part of the respective working cylinder, which presents a danger for the surrounding area, is reliably prevented. Unintentional rocking motions do not occur either on the drive part and accordingly on mechanical components such as an extension arm or the like, which motions are actuated and caused by the drive part. Since in the present invention the desired pressure level is immediately established, pressure spikes in the hydraulic system are avoided. This arrangement promotes a long service life of the overall hydraulic system. Furthermore, the present invention is operationally reliable and economical to produce.

In one preferred embodiment of the suspension device of the present invention, the pressure compensation device is mounted in a parallel connection to the two valve units and the pressure compensation device has a compensator with control inputs connected on the input side of the first valve unit to carry fluid, and to the output side of the first valve unit.

In another preferred embodiment of the suspension device of the present invention, the respective hydraulic accumulator of the accumulator device can be pressurized from the working cylinder by a check valve, which is preferably integrated in the indicated first valve unit.

In this way, the hydraulic accumulator, for example, in the form of a piston accumulator or comparable accumulator designs, is immediately charged with the initial pressure of the drive part. The pertinent pressure level in the hydraulic cylinder can be delivered for a suspension process on the working cylinder as soon as the necessary pressure compensation between the two partial systems is produced beforehand by the compensator. The respective hydraulic cylinder then immediately is applied to the compensated pressure level of the hydraulic accumulator, and dangerous displacement or rocking motions for the drive part in the form of the working cylinder are thus reliably precluded.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
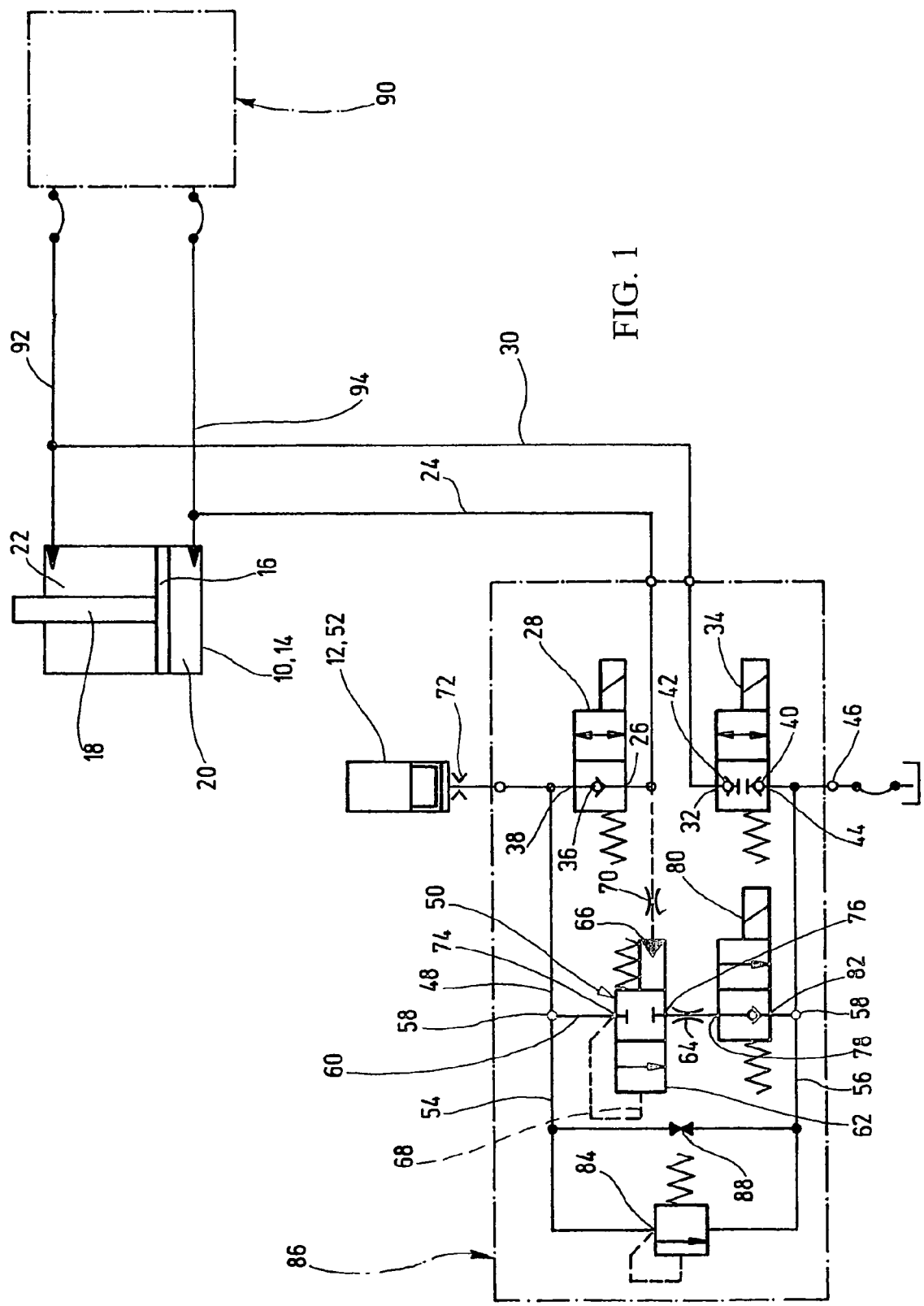
FIG. 1 is a schematic diagram of a suspension device according to an embodiment of the present invention.

A suspension device according to the present invention is designed for at least one drive part 10 to be cushioned and has at least one accumulator device 12 used for suspension. The drive part 10 is a conventional working or hydraulic cylinder 14 with a piston part 16 and rod part 18. The piston part divides the working cylinder 14 into two fluid-carrying working spaces 20, 22. Depending on the amount of fluid held in the working space 20, 22, a definable position for the piston rod part 16, 18 arises therefrom.

The first working or piston space 20 is connected by a first connecting line 24 to the input 26 of a first valve unit 28 to carry fluid. The other, second working or rod space 22 is connected to the input 32 of the second valve unit 34 by a second connecting line 30 to carry fluid. The indicated two valve units 28 and 34 represent conventional, electrically actuatable 2/2-way switching valves. In the unactuated, spring-loaded or biased state, each valve assumes a blocked position in at least in one fluid direction of the respective valve. The first valve unit 28 in its unactuated, spring-loaded initial position is blocked in the direction toward its input 26 by an integrated check valve 36 which can be moved in the direction toward the output 38 of the first valve unit 28 into its open position. As FIG. 1 shows, the two check valves 40 and 42 are blocked against one another, and are arranged flat such that in the unactuated initial position of the second valve unit 34, fluid blocking takes place in two directions, that is, in the direction of the input 32 to the output 44 of the second valve unit 30 and in the reverse direction. The output 44 of the second valve unit 34 is connected to carry fluid to a tank connection 46 leading to the tank system of the hydraulic system for which the suspension device of the present invention is designed. Instead of the integrated check valve 36 in the first valve unit 28, this check valve in an embodiment of the connection, which will not be detailed, can be connected parallel to the valve unit 28 and may be provided with one fluid-carrying connection each in front of the input 26 and the output 38, respectively. The check valve in turn assumes its open position in the direction of the output 38. In the pertinent case, the first valve unit 28 is provided with two check valves which can be unblocked in opposite directions, like the illustrated second valve unit 34. This arrangement has the advantage that valve units 28, 34 with the same configuration can be used to implement the switching.

In the parallel connection 48 to the two indicated valve units 28, 34, there is a pressure compensation device designated as a whole as 50, which in the actuated state equalizes the respective fluid pressure prevailing between the drive part 10 (hydraulic cylinder) and the accumulator device 12 (hydraulic cylinder). The accumulator device 12 generally includes a hydraulic accumulator or hydraulic cylinder 52, for example, in the form of a piston accumulator or the like. The use of hydraulic accumulator assemblies for cushioning and damping of movements in working cylinders is known in the prior art (cf. EP-A-1 157 963). The pertinent assemblies can also be used for "energy recovery", in which hydraulic energy is delivered into the hydraulic accumulator in one working motion of the working cylinder and is then intentionally retrieved from there if the hydraulic cylinder is moved in the opposite direction. In this way, energy savings can be achieved to the relevant extent in the operation of machinery with hydraulic working cylinder devices.

If the pressure compensation means 50 is mounted in a parallel connection 48 to the two valve units 28 and 34, two other connecting lines 54 and 56 lead away from the output 38 of the first valve unit 23 and from the output 44 of the second valve unit 34. Between the two pertinent connecting points 58 in a branch line 60 connecting the connecting points 58, a pressure compensation device 50 is provided essentially in the form of a compensator 62. A compensator is conventionally defined as a valve component designed to keep the volumetric flow which is given by a metering choke constant, even when the load pressure fluctuates. To do this, the compensator operates in an internal control circuit as a differential pressure regulator with a movable control edge which can be changed such that the pressure difference on the metering orifice is always constant, regardless of the prevailing load pressure. Here, the compensator 62 can be connected upstream of the metering choke 64, as shown in the illustrated embodiment. Moreover, the compensator 62 has two control inputs 66 and 68. The first control input 66 can be actuated by another choke 70 by the fluid pressure at the input 26 of the first valve unit 28. The second control input 68 on the opposite side of the compensator 62 can be actuated by the fluid pressure prevailing in the third connecting line 54 to which the hydraulic accumulator 52 is also connected by an orifice 72 to carry fluid. The input side 74 to which the second control input 68 is connected is consequently connected by the third connecting line 54 to the output side 38 of the first valve unit 28. In turn, the output side 76 of the compensator 62 is connected preferably by the metering choke 64 to the input 78 of the third valve unit 80 with an output 82 connected in turn to the tank connection 46 to carry fluid.

The three valve units 28, 34 and 80, together with the compensator 62 and a pressure limitation valve 84, which can be set to a definable pressure and which in turn in a parallel connection to the compensator 62 protects the respective hydraulic accumulator 52 against an overpressure, form a suspension control block 86 as a retrofittable functional unit. The control block can be used even for existing, delivered machinery of any type, if for different systems their suspension comfort and safety are to be improved. Between the branch line 60 and the pressure limitation valve 84 mounted in a parallel connection, a shutoff valve 88 is connected parallel to the pressure compensation means 50. By this shutoff valve, the pressure from the hydraulic accumulator 52 can be released, for example, for carrying out maintenance.

For the respective drive part 10, a control block designated as a whole as 90, is provided, as is conventional in the prior art (EP-A-1 157 963). By two control lines 92, 94, control block 90 ensures the primary function for the drive part 10, specifically actuating the extension and retraction of the piston rod unit 16, 18 of the working cylinder 14. For the corresponding actuation of the control block 90, pressurized fluid is moved into the working space 20 of the working cylinder 14 to raise the piston rod unit 16, 18. The excess fluid in the other working space 22 is returned with the pertinent lifting motion to the control block 90 by the other control line 92. For the lowering motion of the piston rod unit 16, 18, the pertinent process can be reversed, and the excess fluid on the working space side 20 travels by the control line 94 back into the control block 90. Depending on the applied load situation, the pertinent return process can also be supported by the corresponding fluid pressure prevailing in the first control line 92.

For better understanding, the operation of the suspension device of the present invention will be detailed below using one working example.

With the suspension disengaged or blocked, the loading of the extension arm-lifting cylinder 14 can be changed by altering the length of the telescoping extension arm and by loading or unloading a load shovel or load fork (not shown). In the subsequent activation of the suspension, undefined movements caused by the different level pressure which is blocked in the respective hydraulic accumulator 52 relative to the working cylinder 14 are avoided.

For this reason, the hydraulic accumulator 52 is permanently connected by the check valve 36 to the working space 20 of the piston side 16 of the working cylinder 14, and is thereby charged with the maximum pressure occurring in the respective working play with the working cylinder 14. Before activation of the suspension, the third valve unit 80 is briefly opened at this time, so that at this instant the compensator 62 can release the pressure from the hydraulic accumulator 52 to the level of the current pressure on the piston side of the working cylinder 14. Immediately afterwards, the valve 80 is in turn closed.

To activate the suspension, by opening the first valve unit 28, can be regarded as a type of suspension-shutoff valve, the latter is moved into the opened, fluid-carrying valve position and thus the piston side of the working cylinder 14 is connected to the hydraulic accumulator 52. The rod side, that is, the working space 22 of the working cylinder 14, is then connected to the tank connection 46 and accordingly to the tank by simultaneous opening of the second valve unit 34 configured as a prefill valve. The suspension activated in this way can then also be maintained in operation of the working cylinder 14 in which the piston rod unit 16, 18 within the cylinder housing changes in its position. If the prefill valve 34 is closed, to activate the suspension, the suspension shutoff valve 28 is opened. By the control block 90, the working cylinder 14 can be moved for the retraction and extension processes of its piston rod part 16, 18. The fluid pressure then prevailing in the two control lines 92, 94 provides a fluid flow between the working space 20 of the hydraulic cylinder 14 and the control block 90, by the second control line 94.

In the present invention, the hydraulic accumulator 52 is pressurized from the working cylinder 14 by a check valve 36. Because before activation of the suspension the pressure between the hydraulic accumulator 52 and the working cylinder 14 is compensated by the compensator 62, undefined movements of the actuated mechanical parts of a working device or machine, such as a telescoping loader, which movements adversely affect safety, are reliably prevented. Pressure spikes which damage the hydraulic system are likewise avoided by the gentle unblocking and connection of the suspension pressure.

While one embodiment has been chosen to illustrate the invention, it will be understood by those skilled in the art that various changes and modifications can be made therein without departing from the scope of the invention as defined in the appended claims.

What is claimed is:

1. A suspension device, comprising:
   at least one working cylinder having a piston space and a rod space;
   at least one hydraulic accumulator;
   a first valve unit connecting said working cylinder and said hydraulic accumulator in fluid communication, having an input connected in fluid communication to said piston space and having an output connected in fluid communication to said hydraulic accumulator;
   a second valve unit connecting said working cylinder to a tank connection in fluid communication, having an input connected in fluid communication to said rod space and having an output connected in fluid communication to said tank connection; and
   a pressure compensator actuatable to equalize fluid pressure between said working cylinder and said hydraulic accumulator and to produce a common pressure level, said compensator having first and second control inputs connected in fluid communication with said input and said output of said first valve unit, respectively, said first control input being connected in fluid communication to said input of said first valve unit through a choke.

2. A suspension device according to claim 1 wherein said compensator is connected in parallel to said first and second valve units.

3. A suspension device according to claim 1 wherein said hydraulic accumulator is chargeable with fluid pressure via a check valve.

4. A suspension device according to claim 3 wherein said check valve is integrated in said first valve unit.

5. A suspension device according to claim 1 wherein said compensator has an input connected in fluid communication to said output of said first valve unit, and has an output connected in fluid communication to an input of a third valve unit, said third valve unit having an output connected in fluid communication to said tank connection.

6. A suspension device according to claim 5 wherein said output is connected to said input of said third valve unit through a metering choke.

7. A suspension device according to claim 5 wherein a pressure limitation valve is connected in parallel to said compensator to protect said hydraulic accumulator against overpressure; and
said first, second and third valve units and said pressure limitation valve are formed in a suspension control block as a retrofittable functional unit.

8. A suspension device according to claim 1 wherein a control block is connected in fluid communication with said working cylinder by two control lines to activate said working cylinder.

9. A suspension device, comprising:
   at least one working cylinder having a piston space and a rod space;
   at least one hydraulic accumulator;
   a first valve unit connecting said working cylinder and said hydraulic accumulator in fluid communication, having an input connected in fluid communication to said piston space and having an output connected in fluid communication to said hydraulic accumulator;
   a second valve unit connecting said working cylinder to a tank connection in fluid communication, having an input connected in fluid communication to said rod space and having an output connected in fluid commua pressure compensator actuatable to equalize fluid pressure between said working cylinder and said hydraulic accumulator and to produce a common pressure level, said compensator having first and second control inputs connected in fluid communication with said input and said output of said first valve unit, respectively, said compensator having an input connected in fluid communication to said output of said first valve unit, and having an output connected in fluid communication to an input of a third valve unit, said third valve unit having an output connected in fluid communication to said tank connection; and a pressure limitation valve is connected in parallel to said compensator to protect said hydraulic accumulator against overpressure;

said first, second and third valve units and said pressure limitation valve being formed in a suspension control block as a retrofittable functional unit.

10. A suspension device according to claim 9 wherein said output is connected to said input of said third valve unit through a metering choke.

11. A suspension device according to claim 9 wherein said compensator is connected in parallel to said first and second valve units.

12. A suspension device according to claim 9 wherein said hydraulic accumulator is chargeable with fluid pressure via a check valve.

13. A suspension device according to claim 12 wherein said check valve is integrated in said first valve unit.

14. A suspension device according to claim 9 wherein a control block is connected in fluid communication with said working cylinder by two control lines to activate said working cylinder.

* * * * *